United States Patent
Lim et al.

(10) Patent No.: US 7,214,927 B2
(45) Date of Patent: May 8, 2007

(54) METHOD AND APPARATUS USING LIQUID CRYSTAL LIGHT VALVE TO FILTER INCIDENT LIGHT ON A PHOTODETECTOR

(75) Inventors: Len-Li Kevin Lim, Perak (MY); Rizal Jaffar, Melaka (MY); Joon-Chok Lee, Sarawak (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 55 days.

(21) Appl. No.: 10/961,601

(22) Filed: Oct. 8, 2004

(65) Prior Publication Data
US 2006/0076479 A1    Apr. 13, 2006

(51) Int. Cl.
G01D 5/34 (2006.01)
G01J 3/50 (2006.01)
G01J 1/32 (2006.01)
G02F 1/1335 (2006.01)
G02F 1/03 (2006.01)

(52) U.S. Cl. .................. 250/229; 250/226; 250/205; 349/106; 359/245

(58) Field of Classification Search ............. 250/229, 250/226, 205, 201.1, 216; 349/24, 25, 116, 349/104, 106, 107; 359/321, 322, 296, 245, 359/253; 348/335, 340, 345, 347, 349
See application file for complete search history.

(56) References Cited

U.S. PATENT DOCUMENTS

| | | | | |
|---|---|---|---|---|
| 4,792,850 A | * | 12/1988 | Liptoh et al. | 348/57 |
| 4,831,452 A | * | 5/1989 | Takanashi et al. | 348/340 |
| 4,878,741 A | * | 11/1989 | Fergason | 349/79 |
| 4,919,520 A | * | 4/1990 | Okada et al. | 349/13 |
| 4,920,257 A | * | 4/1990 | Fuerthbauer et al. | 250/201.1 |
| 5,047,847 A | * | 9/1991 | Toda et al. | 348/68 |
| 5,486,936 A | * | 1/1996 | Fujikake et al. | 349/86 |
| 5,933,201 A | * | 8/1999 | Okabe | 349/25 |
| 6,437,925 B1 | * | 8/2002 | Nishioka | 359/726 |
| 6,630,801 B2 | * | 10/2003 | Schuurmans | 315/307 |

OTHER PUBLICATIONS http://www.cs.mtu.edu, "Neutral Density Filters", 4 pages, at least as early as Jul. 2, 2004.
Jeff Tyson, "How LCDs Work", http://www.electronics.howstuffworks.com, 8 pages, at least as early as Jul. 6, 2004.

* cited by examiner

*Primary Examiner*—Georgia Epps
*Assistant Examiner*—Pascal M. Bui-Pho

(57) ABSTRACT

In one embodiment, light is detected using a photodetector. If the detected light is causing the photodetector to saturate, one or more liquid crystal light valves are adjusted to filter the amount of incident light on the photodetector.

17 Claims, 3 Drawing Sheets

US 7,214,927 B2

METHOD AND APPARATUS USING LIQUID CRYSTAL LIGHT VALVE TO FILTER INCIDENT LIGHT ON A PHOTODETECTOR

BACKGROUND

A photodetector is sometimes used to sense the light produced by a light source. The sensed light may then be used to regulate the intensity or color of light produced by the light source. If the incident light on the photodetector is too great, the photodetector can saturate. That is, if the incident light on the photodetector is too great, the photodetector may become unable to distinguish between different intensities of incident light. When this happens, the photodetector may not regulate the light source correctly, or may fail to regulate the light source at all.

The likelihood that a photodetector will saturate can be reduced in a variety of ways. One way is to carefully position or orient the photodetector with respect to the light produced by a light source. For example, the photodetector may be placed closer to, or farther from, the light source; or, the photodetector may be oriented perpendicular to, or parallel to, the light produced by the light source.

Another way to keep a photodetector from saturating is to place one or more neutral density filters over the photodetector.

Yet another way to keep a photodetector from saturating is to regulate the light produced by a light source to ensure that the incident light on the photodetector never exceeds a predetermined threshold. This, however, can have the undesirable effect of artificially limiting the light output of the light source.

SUMMARY OF THE INVENTION

In one embodiment, apparatus comprises a photodetector, a light valve, and a control system. The light valve comprises a liquid crystal element that is positioned to filter incident light on the photodetector. The control system determines whether incident light on the photodetector is causing the photodetector to saturate and, if so, applies an electrical stimulus to adjust the light valve.

In another embodiment, apparatus comprises at least one light emitting element, a photodetector, a light valve, and a control system. The photodetector is positioned to receive light emitted by at least some of the light emitting elements. The light valve comprises a liquid crystal element that is positioned to filter incident light on the photodetector. The control system determines whether incident light on the photodetector is causing the photodetector to saturate and, if so, applies an electrical stimulus to adjust the light valve. In response to the light detected by the photodetector, the control system also regulates a drive signal of at least one of the light emitting elements, thereby regulating the light that is emitted by the light emitting element(s).

In yet another embodiment, a method comprises 1) detecting light using a photodetector, and 2) determining whether the detected light is causing the photodetector to saturate and, if so, adjusting one or more liquid crystal light valves to filter the amount of incident light on the photodetector.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
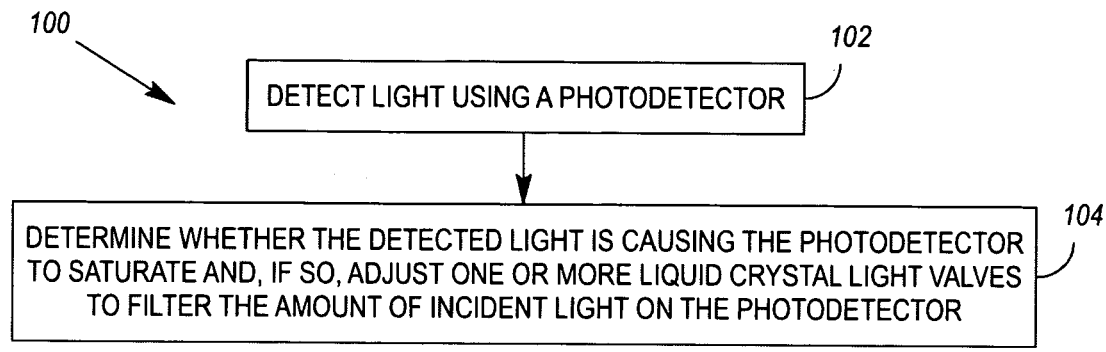
FIG. 1 illustrates an exemplary method for filtering the light received by a photodetector.

FIG. 1 illustrates an exemplary method 100 for filtering the light received by a photodetector. The method 100 comprises 1) detecting 102 light using a photodetector, and 2) determining 104 whether the detected light is causing the photodetector to saturate and, if so, adjusting one or more liquid crystal light valves to filter the amount of incident light on the photodetector.

Figure 2:
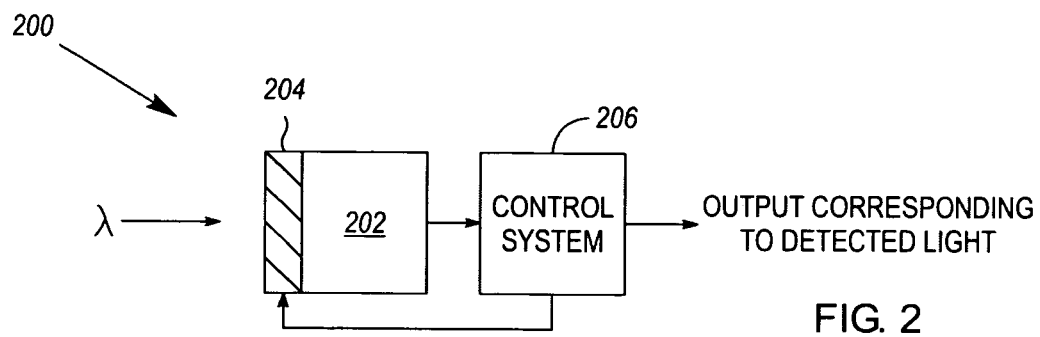
FIG. 2 illustrates first exemplary apparatus for implementing the FIG. 1 method, wherein a light valve is formed from a liquid crystal element.

FIG. 2 illustrates first exemplary apparatus 200 for implementing the method 100. The apparatus 200 comprises a photodetector 202, a light valve 204 and a control system 206. The light valve 204 comprises a liquid crystal element that is positioned to filter incident light on the photodetector 202. The control system 206 determines whether the incident light on the photodetector 202 is causing the photodetector 202 to saturate and, if so, applies an electrical stimulus to adjust (e.g., partially close) the light valve 204. The control system 206 may also determine whether the photodetector 202 is receiving enough incident light and, if not, the control system 206 may apply an electrical stimulus to adjust (e.g., open) the light valve 204.

In one embodiment, the liquid crystal element serves as a color filter. By way of example, the color filter may be achieved by introducing a dye into the liquid crystal element.

Figure 3:
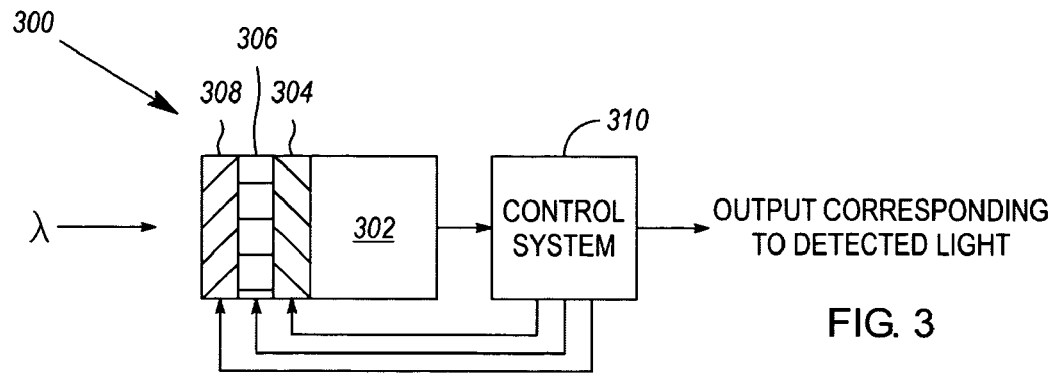
FIG. 3 illustrates second exemplary apparatus for implementing the FIG. 1 method, wherein a light valve comprises a plurality of stacked liquid crystal elements.
Figure 4:
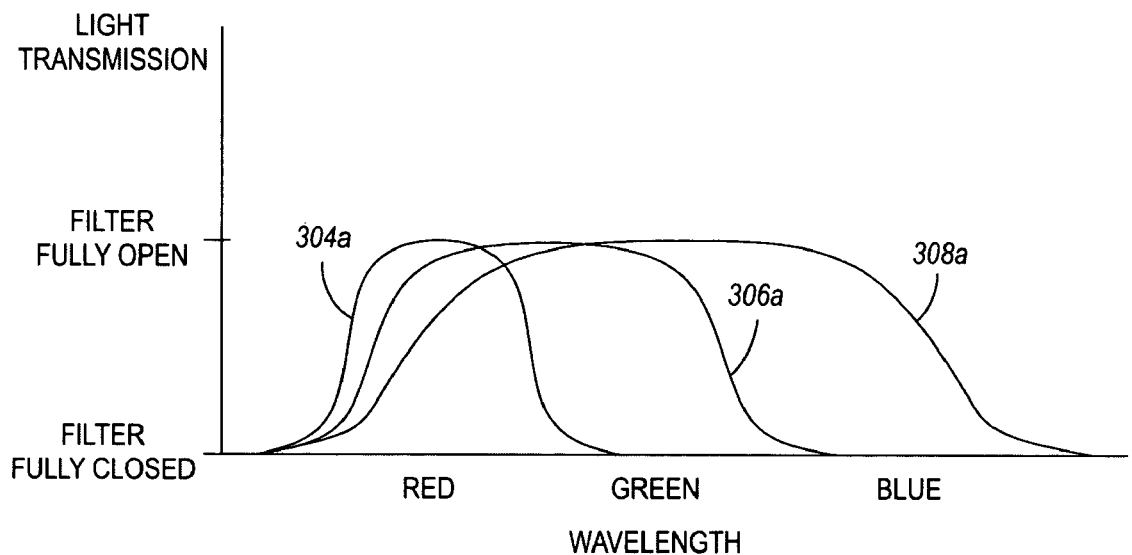
FIG. 4 illustrates the light transmission characteristics of one exemplary set of stacked liquid crystal elements.

FIG. 3 illustrates second exemplary apparatus 300 for implementing the method 100. Similarly to the apparatus 200 shown in FIG. 2, the apparatus 300 shown in FIG. 3 comprises a photodetector 302, a light valve 304, 306, 308 and a control system 310. However, in FIG. 3, the light valve 304–308 comprises a plurality of stacked liquid crystal elements 304–308, each of which serves to filter a different range of light wavelengths, and each of which is separately controlled by the control system 310. In this manner, the control system 310 may adjust the various liquid crystal elements 304–308 to filter the incident light on the photodetector 302 "as a whole" or "by color". In the latter case, the light valve 304–308 may be placed in a series of configurations that allow the photodetector 302 to serially detect the intensity of each of a plurality of different ranges of light wavelengths. For example, as shown in FIG. 4, the stacked liquid crystal elements 304–308 may be designed to pass overlapping ranges of light wavelengths. Thus, the first liquid crystal element 308 could pass red, green and blue light (see response 308a), the second liquid crystal element 306 could pass only red and green light (see response 306a), and the third liquid crystal element 304 could pass only red light (see response 304a). Then, by acquiring photodetector readings with all three filters 304, 306, 308 open; with only the second two filters 304, 306 open; and with only the third filter 304 open, the control system 310 can subtract different sets of readings to determine how to regulate the filters 304–308.

Figure 5:
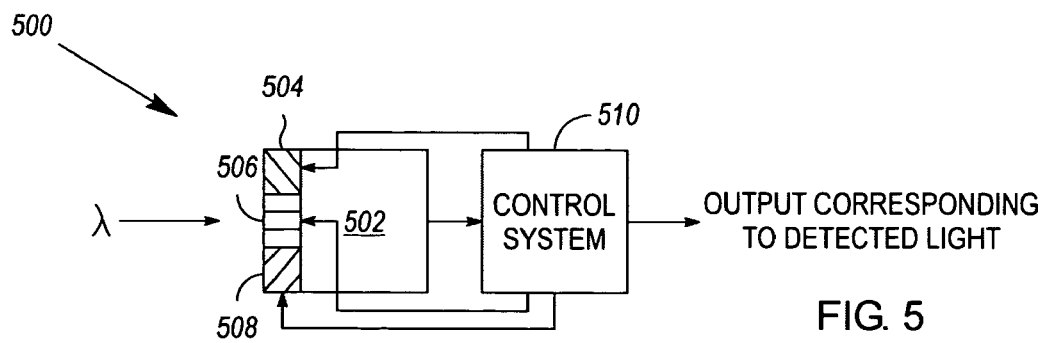
FIG. 5 illustrates third exemplary apparatus for implementing the FIG. 1 method, wherein a plurality of liquid crystal light valves are used to filter the incident light on a photodetector.

FIG. 5 illustrates third exemplary apparatus 500 for implementing the method 100. The apparatus 500 shown in FIG. 5 is similar to that shown in FIG. 2, but for the addition of additional liquid crystal light valves 504, 506, 508, each of which serves to filter a different range of light wavelengths, and each of which is separately controlled by the control system 510. In this manner, the control system 510 may adjust ones of the light valves 504–508 to filter the incident light on the photodetector 502 "as a whole" or "by color". In the latter case, the light valves 504–508 may be placed in a series of configurations that allow the photodetector 502 to serially detect the intensity of each of a plurality of different wavelengths of light (e.g., by sequentially opening ones of the light valves 504–508 to filter red, green and then blue light).

By way of example, the photodetectors 202, 302, 502 shown in FIGS. 2, 3 and 5 may be photodiodes.

Figure 6:
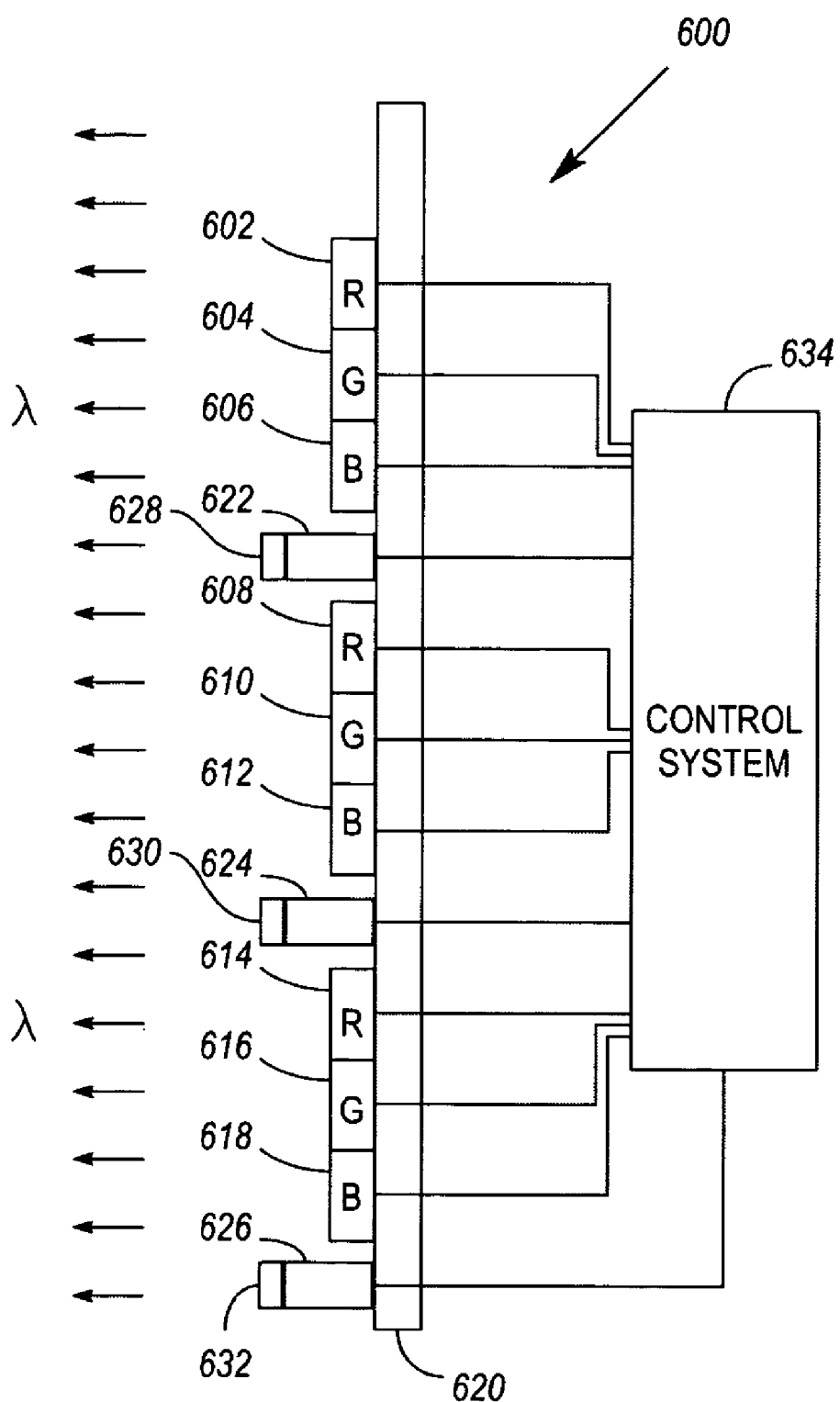
FIG. 6 illustrates an exemplary illumination or display device in which the apparatus shown in any of FIG. 2, 3 or 5 may be incorporated.

FIG. 6 illustrates the use of any of the photodetector and light valve combinations shown in FIG. 2, 3 or 5 to regulate the light emitted by one or more light emitting elements 602–608 in an illumination or display device 600. By way of example, the light emitting elements 602–608 may comprise same-colored or different colored (e.g., red, green and blue) light emitting diodes (LEDs; including inorganic or organic LEDs), laser diodes, gas discharge lamps, or plasma display panel (PDP) elements. Also, by way of example, the light emitting elements 602–608 may form all or part of a transmissive display (e.g., a liquid crystal display (LCD)), a self-emissive display (e.g., a PDP), a display backlight, or other illumination or display device. The light emitting elements 602–608 are shown to be mounted on a common substrate 620, such as a printed circuit board. However, they need not be.

As further shown in FIG. 6, one or more photodetectors 622, 624, 626 are positioned to receive light emitted by some or all of the light emitting elements 602–608. Light valves 628, 630, 632, formed as shown in any of FIG. 2, 3 or 5, or in other ways, may be used to filter the incident light on the photodetectors 622–626. Depending on the light valve used, both the intensities and colors of light incident on the photodetectors 622–626 may be controlled.

In response to the light detected by a photodetector, one or more drive signals of one or more of the light emitting elements 602–608 may be regulated, thereby regulating the light emitted by the light emitting elements 602–608.

In some embodiments, the control systems associated with each of a number of light valves 628–632 may be linked, or a single control system 634 may be responsible for adjusting a plurality of light valves 628–632. In this manner, the control system's adjustment of one light valve 628 may cause it to adjust other light valves 630, 632 in a similar fashion. In some cases, the adjustment of light valves 628–632 in a similar fashion may be necessary to ensure that different elements or regions of an illumination or display device 600 are regulated in the same manner.

If a light valve 628 used in the device 600 shown in FIG. 6 comprises stacked liquid crystal elements (or plural adjacent light valves) to filter different colors of light, the control system 634 may separately control the different liquid crystal elements of the valve or valves to obtain photodetector readings for different colors of incident light. Then, in response to the different colors of light detected by the photodetector 628, drive signals of different colored ones of the light emitting elements 602–608 may be separately regulated, thereby regulating the light emitted by the light emitting elements 602–608.

What is claimed is:

1. Apparatus, comprising: a photodetector; a light valve comprising a liquid crystal element, positioned to filter incident light on the photodetector; and a control system to determine whether incident light on the photodetector is causing the photodetector to saturate and, if so, apply an electrical stimulus to adjust the light valve; wherein the light valve comprises a plurality of stacked liquid crystal elements, each of which serves to filter a different range of light wavelengths, and each of which is separately controlled by the control system.

2. The apparatus of claim 1, wherein the liquid crystal element serves as a color filter.

3. The apparatus of claim 1, wherein the different liquid crystal elements respectively pass overlapping ranges of light wavelengths.

4. The apparatus of claim 1, further comprising at least one additional light valve, each comprising a liquid crystal element; said light valves being positioned adjacent one another; said light valves each passing a different color of incident light to the photodetector; and said light valves each being separately controlled by the control system.

5. The apparatus of claim 4, wherein the light valves respectively pass red, green and blue light.

6. The apparatus of claim 1, wherein the control system further determines whether the photodetector is receiving enough incident light and, if not, applies an electrical stimulus to adjust the light valve.

7. Apparatus, comprising:
at least one light emitting element;
a photodetector, positioned to receive light emitted by at least some of the light emitting elements;
a light valve comprising a liquid crystal element, positioned to filter incident light on the photodetector; and
a control system to i) determine whether incident light on the photodetector is causing the photodetector to saturate and, if so, apply an electrical stimulus to adjust the light valve, and ii) in response to the light detected by the photodetector, regulate a drive signal of a first one or more of the light emitting elements, thereby regulating the light that is emitted by the first one or more light emitting elements.

8. The apparatus of claim 7, further comprising:
a second photodetector, positioned to receive light emitted by at least some of the light emitting elements; and
a second light valve comprising a second liquid crystal element, positioned to filter incident light on the second photodetector;
wherein the control system further i) determines whether incident light on the second photodetector is causing the second photodetector to saturate and, if so, applies an electrical stimulus to adjust the second light valve, ii) in response to adjusting one of the light valves, adjusts the other light valve in a similar fashion, and iii) in response to the light detected by the second photodetector, regulates a drive signal of a second one or more of the light emitting elements, thereby regulating the light that is emitted by the second one or more of the light emitting elements.

9. The apparatus of claim 8, wherein the light emitting elements comprise light emitting diodes (LEDs).

10. The apparatus of claim 7, wherein:
the light emitting elements comprise a plurality of different colored light emitting elements;
the liquid crystal element serves as a color filter; and
each of the first one or more light emitting elements emits light corresponding to said color filter.

11. The apparatus of claim 10, wherein the light emitting elements comprise light emitting diodes (LEDs).

12. The apparatus of claim 7, wherein:
the light emitting elements comprise a plurality of different colored light emitting elements;
the light valve comprises a plurality of stacked liquid crystal elements, each of which serves to filter a different range of light wavelengths; and
the control system further i) separately controls the liquid crystal elements to obtain photodetector readings for different wavelengths of incident light, and ii) in response to the different wavelengths of light detected by the photodetector, separately regulates drive signals of different colored ones of the light emitting elements, thereby regulating the light that is emitted by the light emitting elements.

13. The apparatus of claim 12, wherein the different liquid crystal elements respectively pass overlapping ranges of light wavelengths.

14. The apparatus of claim 12, wherein the light emitting elements comprise light emitting diodes (LEDs).

15. The apparatus of claim 7, wherein:
the light emitting elements comprise a plurality of different colored light emitting elements;
the apparatus further comprises at least one additional light valve, each comprising a liquid crystal element; said light valves being positioned adjacent one another; said light valves each passing a different color of incident light to the photodetector; and said light valves each being separately controlled by the control system; and
the control system further i) separately controls the liquid crystal elements to obtain photodetector readings for different colors of incident light, and ii) in response to the different colors of light detected by the photodetector, separately regulates drive signals of different colored ones of the light emitting elements, thereby regulating the light that is emitted by the light emitting elements.

16. The apparatus of claim 15, wherein the liquid crystal elements respectively filter red, green and blue light.

17. The apparatus of claim 7, wherein the control system further determines whether the photodetector is receiving enough incident light and, if not, applies an electrical stimulus to adjust the light valve.

* * * * *